United States Patent
Meth et al.

(10) Patent No.: US 6,332,199 B1
(45) Date of Patent: Dec. 18, 2001

(54) RESTORING CHECKPOINTED PROCESSES INCLUDING ADJUSTING ENVIRONMENT VARIABLES OF THE PROCESSES

(75) Inventors: Kalman Zvi Meth, Netanya; Adnan M. Agbaria, Musmus, both of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,357

(22) Filed: Oct. 29, 1998

(51) Int. Cl.⁷ ..................................... G06F 11/00
(52) U.S. Cl. .............................. 714/13; 711/161
(58) Field of Search .................... 714/13, 15, 20, 714/25, 26, 38, 41, 42, 47, 6, 7, 8, 5; 711/135, 143, 161, 146

(56) References Cited

U.S. PATENT DOCUMENTS

| | | | |
|---|---|---|---|
| 4,703,481 | | 10/1987 | Fremont ................................. 371/12 |
| 4,905,196 | | 2/1990 | Kirrmann ............................ 365/200 |
| 5,163,150 | | 11/1992 | Matsushima et al. ............... 395/725 |
| 5,241,679 | | 8/1993 | Nakagawa et al. .................. 395/725 |
| 5,301,309 | | 4/1994 | Sugano ................................. 395/575 |
| 5,421,003 | * | 5/1995 | Escola et al. ........................ 395/575 |
| 5,440,726 | * | 8/1995 | Fuchs et al. ...................... 395/82.18 |
| 5,475,822 | | 12/1995 | Sibigtroth et al. ................... 395/375 |
| 5,530,801 | * | 6/1996 | Kobayashi ...................... 395/182.11 |
| 5,530,802 | * | 6/1996 | Fuchs et al. .................... 395/182.15 |

(List continued on next page.)

OTHER PUBLICATIONS

Checkpoint and Migration of Unix Processing In The Condor Distributed Processing System, Todd Tannenbaum, Michael Litskow, Dr. Dobbs Journal, 227:40–48, Feb. 1995.

Supporting Checkpointing and Process Migration Outside The Unix Kernel, M. Litskow, M. Solomon, Proceedings of Usenix Winter 1992 Conference, Jan. 1992.

LIBCKPT: Transparent Checkpointing Under Unix, James S. Plank, Micah Beck, Gerry Kingsley, Kai Li, Usenix Winter 1995 Technical Conference, Jan. 1995.

An Overview of Checkpointing in Uniprocessor and Distributed Systems, Focusing on Implmentaiton and Performance, James S. Plank, Technical Report UT–CS–97–372, University of Tennessee, Jul. 1997.

Efficient Checkpointing on MIMD Architectures, James Steven Plank, PhD Dissertation, Princeton University, Jun. 1993.

Checkpointing Distributed Shared Memory, Luis M. Silva, Joao Gabriel Silva, The Journal of Supercomputing, 11:137–158 (1997).

A Checkpointing Strategy For Scalable Recovery On Distributed Parallel Systems, Vijay K. Naik, Samuel P. Midkiff, Jose E. Moreira, IBM Research Report, Jun. 23, 1997.

Primary Examiner—Nadeem Iqbal
(74) Attorney, Agent, or Firm—Lawrence D. Cutter, Esq.; Floyd A. Gonzalez, Esq.; Heslin Rothenberg Farley & Mesiti, P.C.

(57) ABSTRACT

A checkpoint of a process is taken in order to provide a consistent state of the process in the event the process is to be restarted. When the process is restarted, the process is placed in the state it was in when the checkpoint was taken. However, there are times when certain information has changed since the last checkpoint and it should not be restored. For example, if a process is restarted on a computing unit different from the one in which the checkpoint was taken, then environment variables associated with the new computing unit, such as the name of the computing unit, are not to be restored to the values they were before the checkpoint. In order to prevent this, one or more environment variables are adjusted, after the process is restored to the reflect the state they were in prior to restoration.

23 Claims, 4 Drawing Sheets

U.S. PATENT DOCUMENTS

| | | | |
|---|---|---|---|
| 5,551,043 | 8/1996 | Crump et al. | 395/750 |
| 5,590,277 | * 12/1996 | Fuchs et al. | 395/183.14 |
| 5,615,371 | 3/1997 | Iuchi | 395/704 |
| 5,630,047 | 5/1997 | Wang | 395/182.13 |
| 5,644,742 | 7/1997 | Shen et al. | 395/591 |
| 5,659,721 | 8/1997 | Shen et al. | 395/569 |
| 5,845,292 | * 12/1998 | Bohannon et al. | 707/202 |
| 5,845,326 | * 12/1998 | Hirayama et al. | 711/135 |
| 5,907,673 | * 5/1999 | Hirayama et al. | 395/182.14 |
| 5,931,954 | * 8/1999 | Hoshina et al. | 714/15 |
| 6,009,414 | * 12/1999 | Hoshiya et al. | 705/30 |
| 6,044,475 | * 3/2000 | Chung et al. | 714/15 |
| 6,088,773 | * 7/2000 | Kano et al. | 711/161 |
| 6,105,148 | * 8/2000 | Chung et al. | 417/16 |
| 6,154,877 | * 11/2000 | Ramkumar et al. | 717/11 |
| 6,161,193 | * 12/2000 | Garg et al. | 714/6 |
| 6,161,219 | * 12/2000 | Ramkumar et al. | 717/11 |

* cited by examiner fig. 1A fig. 1B fig. 2 fig. 3 fig. 4 fig. 5

RESTORING CHECKPOINTED PROCESSES INCLUDING ADJUSTING ENVIRONMENT VARIABLES OF THE PROCESSES

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"A METHOD OF PERFORMING CHECKPOINT/ RESTART OF A PARALLEL PROGRAM," by Meth, et al., Ser. No. 09/181,985, and "A SYSTEM OF PERFORMING CHECKPOINT/ RESTART OF A PARALLEL PROGRAM," by Meth et al., Ser. No. 09/181,981, "PROGRAM PRODUCTS FOR PERFORMING CHECKPOINT/ RESTART OF A PARALLEL PROGRAM," by Meth et al., Ser. No. 09/182,555, "CAPTURING AND IDENTIFYING A COMPLETE AND CONSISTENT SET OF CHECKPOINT FILES," by Meth et al., Ser. No. 09/182,175, "RESTORING CHECKPOINTED PROCESSES WITHOUT RESTORING ATTRIBUTES OF EXTERNAL DATA REFERENCED BY THE PROCESSES," by Meth et al., Ser. No. 09/182,725, now U.S. Pat. No. 6,256,751.

TECHNICAL FIELD

This invention relates, in general, to restoring checkpointed processes and, in particular, to adjusting values of selected information, such as environment variables, after using checkpointed data to restore a process.

BACKGROUND ART

A requirement of any robust computing environment is to be able to recover from errors, such as device hardware errors (e.g., mechanical or electrical errors) or recording media errors. In order to recover from some device or media errors, it is necessary to restart a process, either from the beginning or from some other point within the process.

To facilitate recovery of a process, especially a long running process, intermediate results of the process are taken at particular intervals. This is referred to as checkpointing the process. Checkpointing enables the process to be restarted from the last checkpoint, rather than from the beginning of the process.

When a process is restarted, it is restored to the state it was in when the checkpoint was taken. Thus, any and all changes subsequent to the last checkpoint are undone. This includes any changes that have been made to the environment variables associated with the process. Once the process is restored to its former state, it continues to execute from that point.

Based on the foregoing, a need exists for a restore capability that does not require that all information be restored to the point at which the checkpoint was taken. That is, a need exists for a capability that allows selected information to remain unrestored. A need exists for a capability that enables selected information to be adjusted as part of the restoration, such that the selected information reflects the current operating environment rather than the operating environment at the time the checkpoint was taken.

SUMMARY OF THE INVENTION

The shortcomings of the prior art are overcome and additional advantages are provided through the provision of a method of restoring checkpointed processes. The method includes, for instance, restarting a process on a computing unit from a checkpoint taken of the process; restoring one or more information components of the process using data obtained from the checkpoint; changing a value of a restored information component to a new value; and executing the process using the new value of the one restored information component.

In one example, the one or more information components include one or more environment variables. Further, in another example, the new value is saved, prior to restoring the one or more environment variables. For instance, the new value is saved in a stack of the process.

In another embodiment, the one or more environment variables are located in a stack and/or a data section of the process, and the method includes restoring the data section using data obtained from the checkpoint, wherein the restoring of the data section includes restoring any of the one or more environment variables located within the data section. The method further includes copying the new value from the stack to the restored data section, and restoring the stack using data obtained from the checkpoint. The restoring of the stack includes restoring any of the one or more environment variables located within the stack. Further, the changing of the value includes replacing the value of the restored environment variable located in either the restored stack or the restored data section with the new value, which is located in the restored data section.

In another aspect of the present invention, a method of restoring checkpointed processes is provided. The method includes, for instance, restarting a process on a computing unit from a checkpoint taken of the process. The process includes one or more environment variables located in a stack of the process and/or a data section of the process. The method further includes saving in the stack at least one new value for at least one environment variable; restoring the data section using information obtained from the checkpoint; copying the at least one new value from the stack to the restored data section; restoring the stack, subsequent to the copying, using information obtained from the checkpoint; and replacing at least one value for the at least one environment variable located in the restored stack and/or the restored data section with the at least one new value saved in the stack.

In a further aspect of the present invention, a system of restoring checkpointed processes is provided. The system includes, for instance, means for restarting a process on a computing unit from a checkpoint taken of the process; means for restoring one or more information components of the process using data obtained from the checkpoint; means for changing a value of one restored information component to a new value; and means for executing the process using the new value of the restored information component.

In yet a further aspect of the present invention, a system of restoring checkpointed processes is provided. The system includes, for example, a computing unit adapted to restart a process from a checkpoint taken of the process, and to restore one or more information components of the process using the data obtained from the checkpoint. The computing unit is further adapted to change a value of one restored information component to a new value, and to execute the process using the new value.

In another aspect of the present invention, a system of restoring checkpointed processes is provided. This system includes, for example, means for restarting a process on a computing unit from a checkpoint taken of the process, wherein the process includes one or more environment variables located in at least one of a stack of the process and a data section of the process; means for saving in the stack at least one new value for at least one environment variable; means for restoring the data section using information obtained from the checkpoint; means for copying the at least one new value from the stack to the restored data section; means for restoring the stack, subsequent to the copying, using information obtained from the checkpoint; and means for replacing at least one value for the at least one environment variable located in at least one of the restored stack and the restored data section with the at least one new value saved in the stack.

In yet another aspect of the present invention, at least one program storage device readable by a machine, tangibly embodying at least one program of instructions executable by the machine to perform a method of restoring checkpointed processes is provided. The method includes, for instance, restarting a process on a computing unit from a checkpoint taken of the process; restoring one or more information components of the process using data obtained from the checkpoint; changing a value of one restored information component to a new value; and executing the process using the new value of the restored information component.

In another aspect of the present invention, an article of manufacture, including at least one computer usable medium having computer readable program code means embodied therein for causing the restoring of checkpointed processes, is provided. The computer readable program code means in the article of manufacture includes, for example, computer readable program code means for causing a computer to restart a process on a computing unit from a checkpoint taken of the process, wherein the process includes one or more environment variables located in at least one of a stack of the process and a data section of the process; computer readable program code means for causing a computer to save in the stack at least one new value for at least one environment variable; computer readable program code means for causing a computer to restore the data section using information obtained from the checkpoint; computer readable program code means for causing a computer to copy the at least one new value from the stack to the restored Data Section; computer readable program code means for causing a computer to restore the stack, subsequent to the copying, using information obtained from the checkpoint; and computer readable program code means for causing a computer to replace at least one value for the at least one environment variable located in at least one of the restored stack and the restored data section with the at least one new value saved in the stack.

The capabilities of the present invention advantageously provide for the adjusting of selected information after restoring a process from a checkpoint. This allows a process to be restored and to still reflect some aspects of the current operating environment. Thus, greater flexibility is provided for the restarted process. For example, a process can be restarted on a different computing unit and the new computing unit is reflected in the process, rather than the old computing unit.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, restore capabilities are provided that enable selected information (i.e., certain components of information), such as desired environment variables, to be adjusted, after a checkpointed process is restarted. For example, after a process is restored to the state it was in when the checkpoint was taken, various environment variables are adjusted to reflect the current operating environment, instead of the operating environment from when the checkpoint was taken. This is advantageous when, for instance, the process is restarted on a different computing unit than the one used when the checkpoint was taken (i.e., the process is migrated).

Figure 1A:
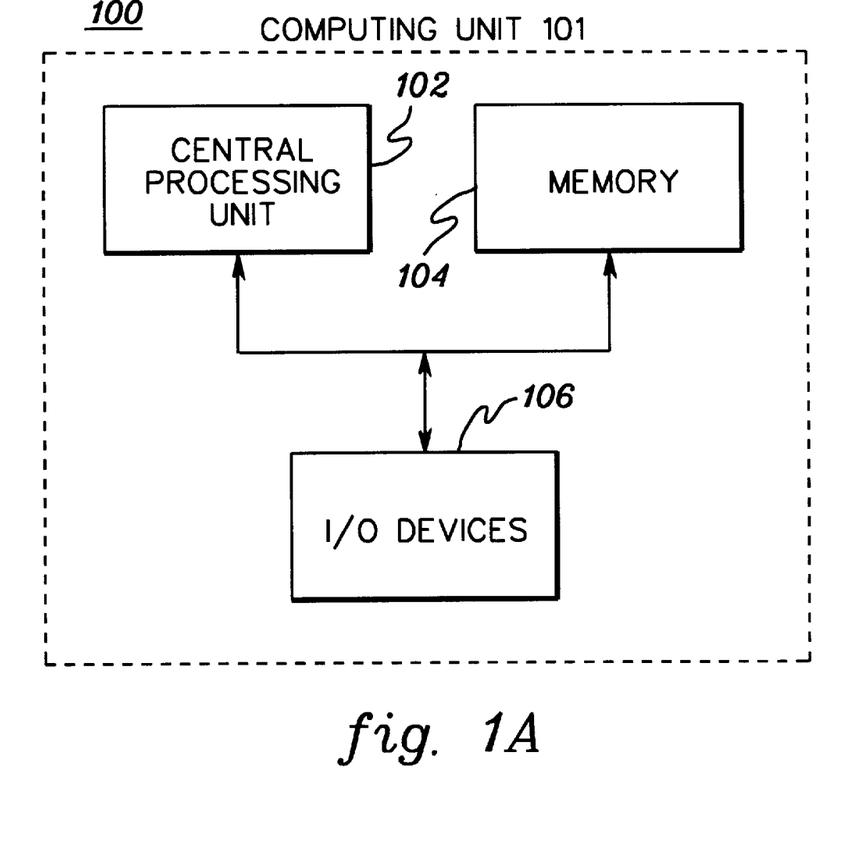
FIGS. 1a and 1b depict examples of computing environments incorporating and using the restore capabilities of the present invention.

One example of a computing environment incorporating and using the restore capabilities of the present invention is depicted in FIG. 1a. Computing environment 100 includes, for instance, a computing unit 101 having at least one central processing unit 102, a main memory 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions.

The central processing unit executes at least one operating system, which as known, is used to control the operation of the computing unit by controlling the execution of other programs, controlling communication with peripheral devices and controlling use of the computer resources.

Central processing unit 102 is coupled to main memory 104, which is directly addressable and provides for high speed processing of data by the central processing unit. Main memory 104 may be either physically integrated with the CPU or constructed in standalone units.

Main memory 104 and central processing unit 102 are also coupled to one or more input/output devices 106. These devices include, for instance, keyboards, communications controllers, teleprocessing devices, printers, magnetic storage media (e.g., tape, disks), direct access storage devices, sensor-based equipment, and other storage media. Data is transferred from main memory 104 to input/output devices 106, and from the input/output devices back to main memory.

In one example, computing environment 100 is a single system environment, which includes an RS/6000 computer system running an AIX operating system. (RS/6000 and AIX are offered by International Business Machines Corporation). In another example, computing environment 100 includes a UNIX workstation running a UNIX-based operating system. Other variations are also possible and are considered a part of the claimed invention.

Figure 1B:
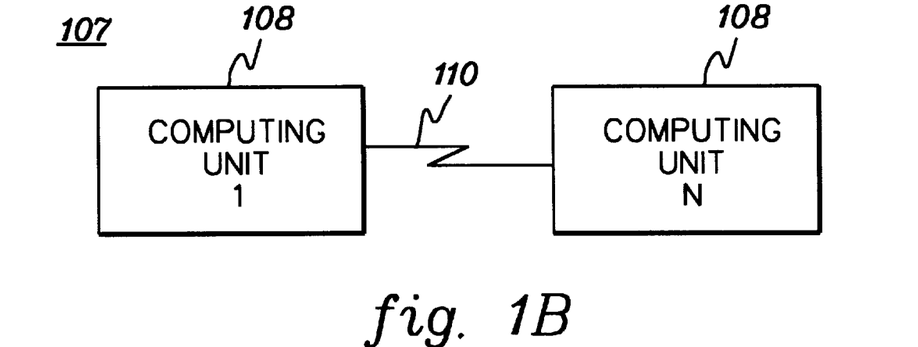

Another embodiment of a computing environment incorporating and using the restore capabilities of the present invention is depicted in FIG. 1b. In one example, a computing environment 107 includes a plurality of computing units 108 coupled to one another via a connection 110. In one example, each unit is an RS/6000 computing node running AIX, and the units are coupled together via a token ring or a local area network (LAN). Each unit includes, for example, a central processing unit, memory and one or more input/output devices.

In another embodiment, each unit is a UNIX workstation running a UNIX-based operating system, and the units are coupled to one another via a TCP/IP connection.

In yet a further embodiment, the environment includes a large parallel system with a plurality of units (e.g., 512 nodes) coupled to one another via a network connection, such as a switch. The invention is not limited to a particular number of units coupled together.

The above embodiments are only examples, however. The capabilities of the present invention can be incorporated and used with any type of computing environments or computing units (e.g., nodes, computers, processors, systems, machines, and/or workstations), without departing from the spirit of the present invention.

A computing unit of the present invention is capable of executing both serial processes and parallel programs. A parallel program includes one or more processes (or tasks) that are executed independently.

Figure 2:
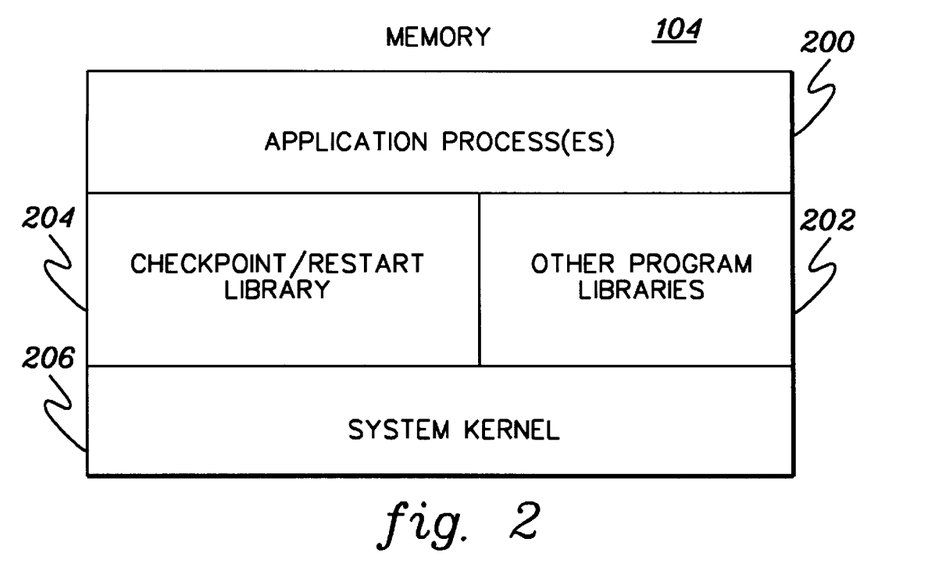
FIG. 2 depicts one example of various components of the memory depicted in FIG. 1a, in accordance with the principles of the present invention.

Each process (e.g., a serial process, a process of a parallel program, or any other type of process) is loaded in the memory of the computing unit that is to execute the process. This is depicted in FIG. 2. As one example, memory 104 includes one or more application processes 200. Each process makes library calls to various program libraries 202, also loaded within the memory. One program library that is called, in accordance with the principles of the present invention, is a checkpoint/restart library 204. Checkpoint/restart library 204 is called by each process that wishes to use the checkpoint/restart capabilities of the present invention. In addition to the above, memory 104 includes a system kernel 206, which provides various system services to the application processes and the libraries.

Figure 3:
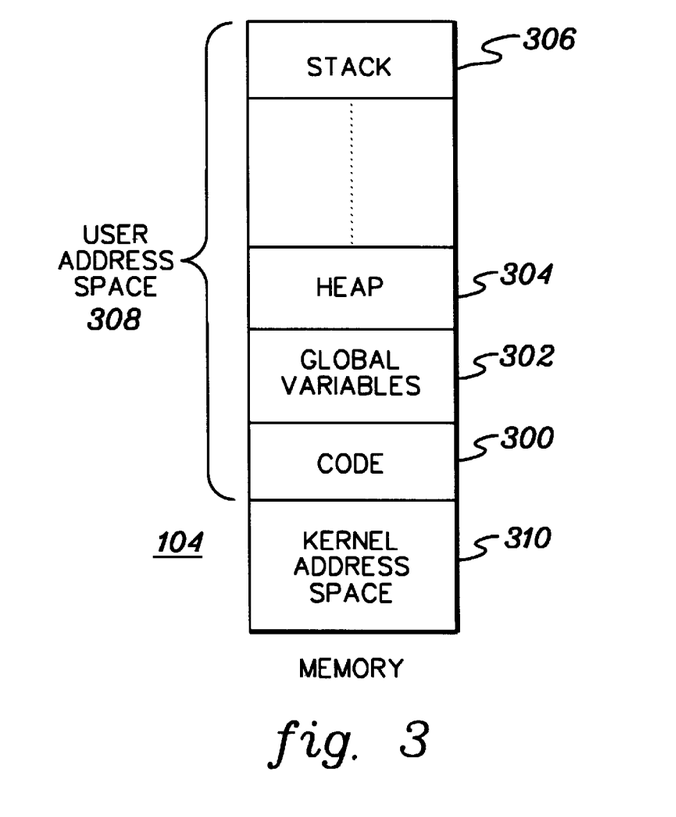
FIG. 3 depicts one embodiment of a memory layout of a process, in accordance with the principles of the present invention.

Memory 104 is further described with reference to FIG. 3, which depicts one embodiment of the memory layout for an application process. In particular, for each process, memory 104 includes programming code 300, global variables 302 used by the process, a heap 304 (for dynamic memory allocation while the program is running), and a stack 306. The global variables and the heap are referred to as the "Data Section" of the process, which is distinct from the stack of the process. Each process running in the computing unit has, in addition to its code, a separate portion of memory to store its Data Section and stack. This section is referred to as a user address space 308. In addition to the user address space, the memory includes a kernel address space 310 for running the system kernel.

Each process running in the computing unit also has a separate copy of the registers, which includes a stack pointer and a program counter.

Figure 4:
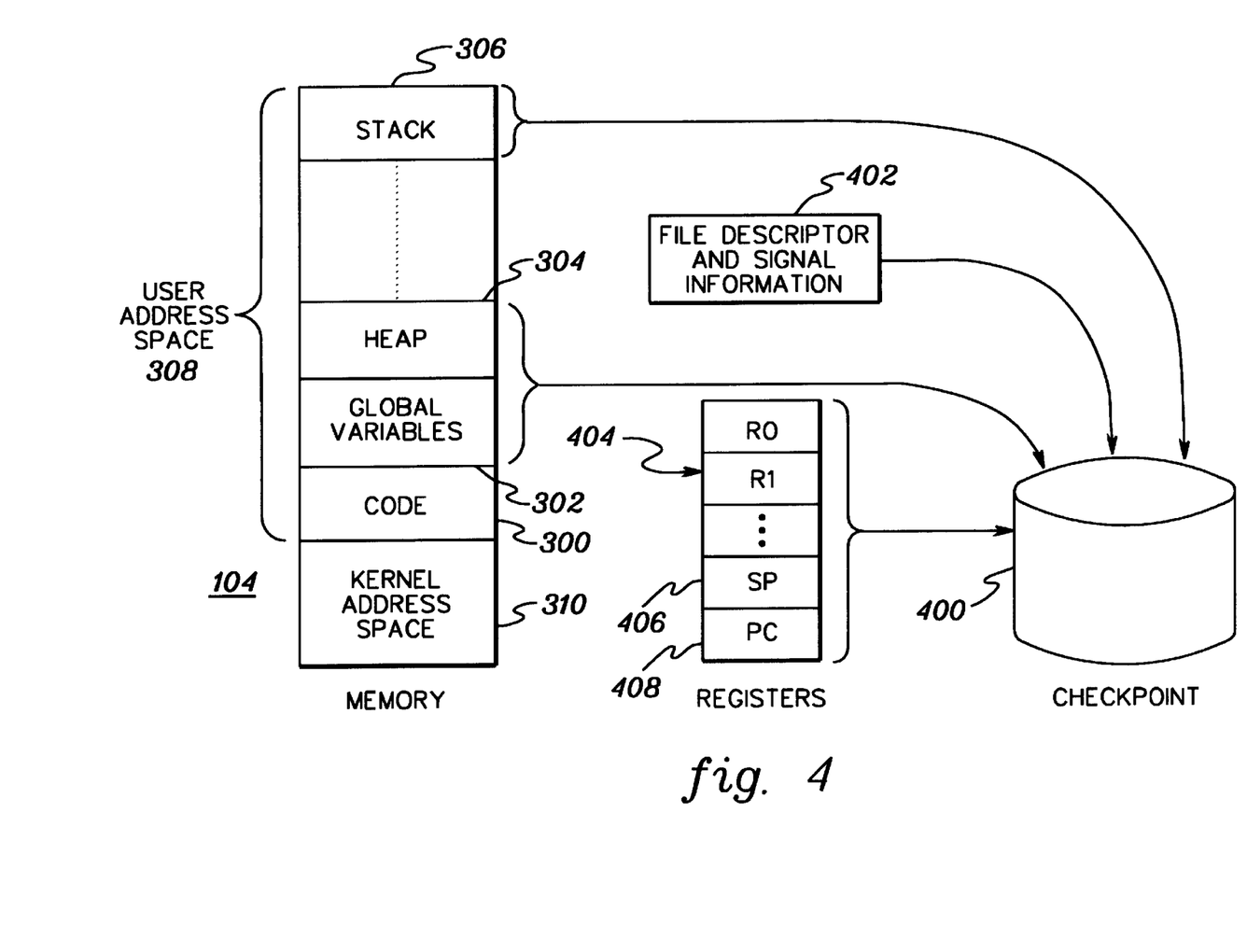
FIG. 4 depicts one embodiment of the information saved during the taking of a checkpoint of a process, in accordance with the principles of the present invention.

When a process is executing, checkpoints are taken, at particular intervals, in order to provide intermediate points at which a process may be restarted. When a user-level checkpoint is taken, certain information is saved, as depicted in FIG. 4. For example, the Data Section of a process, including global variables 302 and heap 304, are saved to a checkpoint file 400, which is stored in local or global storage. Additionally, stack 306 and various file descriptor and signal information 402 are saved to the checkpoint file. Further, one or more registers 404, including a stack pointer 406 and a program counter 408, are saved in the checkpoint file. Code 300 need not be saved, since the original code remains unchanged when the program runs, and the original copy of the code is used during restart.

Embodiments for taking a checkpoint are described in "Checkpoint and Migration of Unix Processes in the Condor Distributed Processing System", by Todd Tannenbaum, Michael Litzkow, Dr. Dobbs Journal, 227:40–48, Feb. 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, Apr. 1977, each of which is hereby incorporated herein by reference in its entirety. Another embodiment for taking a checkpoint is described in detail in co-pending, commonly assigned, U.S. patent application entitled "A Method of Performing Checkpoint/Restart of a Parallel Program," by Meth et al., Ser. No. 09/081,985, which is hereby incorporated herein by reference in its entirety.

The data saved during the checkpointing of the process is used to restart the process, should a restart be necessary. One embodiment of the logic used to restart a process is described in detail with reference to FIG. 5. Initially, the current values of selected information components are obtained and saved, STEP 500. For example, the current values of various selected environment variables are obtained from the stack and/or Data Section of the process via, for instance, a UNIX getenv function call.

Figure 5:
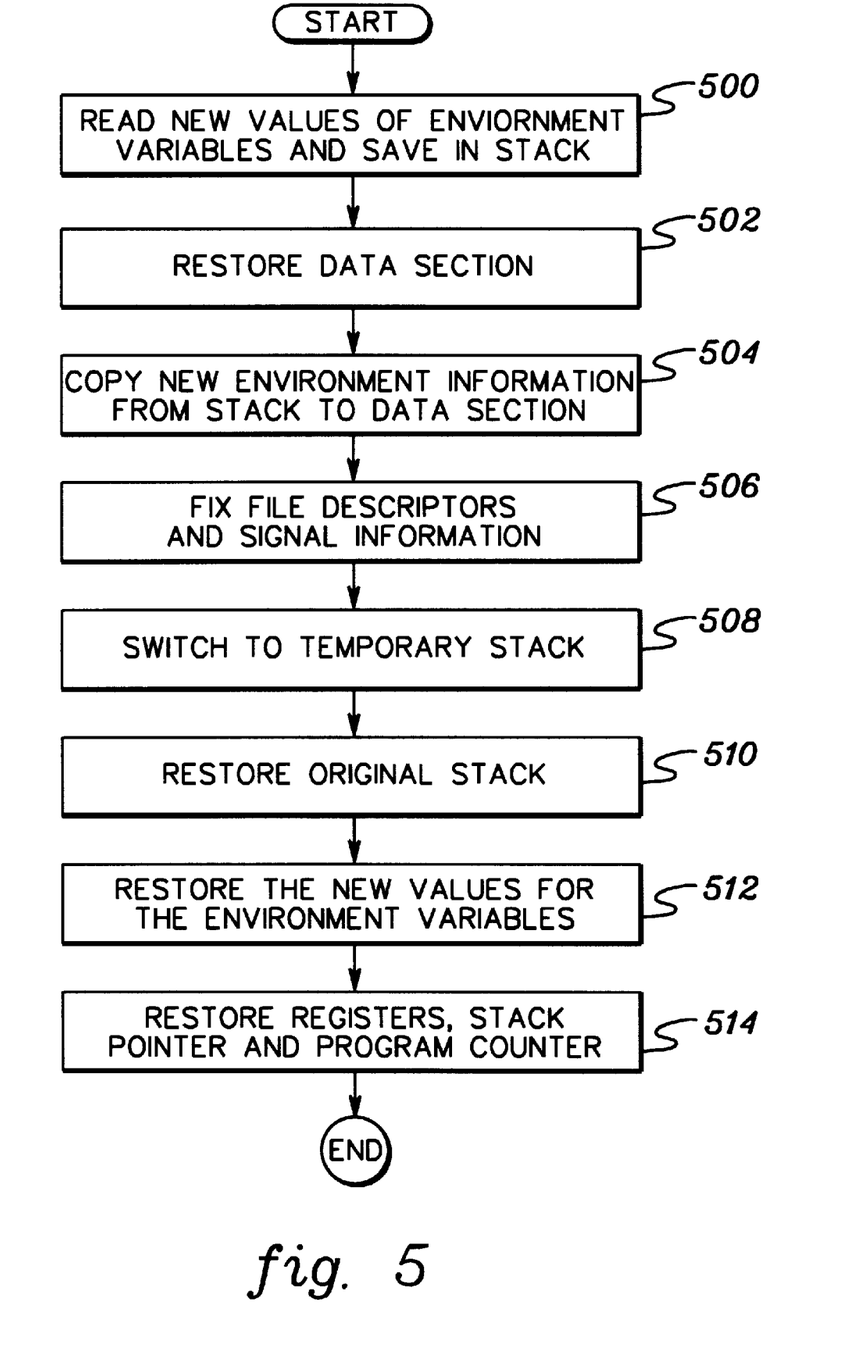
FIG. 5 depicts one embodiment of the logic associated with restarting a process using the checkpoint data previously taken, in accordance with the principles of the present invention.

In particular, there are a number of environment variables that are defined by the programmer and are stored in the stack and/or the Data Section of the process. These environment variables include, for instance, the name of the computing unit executing the process, the name of the process, an Internet address for the process, an indication of whether to write the output of the process to a file or a computer screen, file descriptors to pipes, and the file descriptor to which a standard error is written, to name a few. One or more of these variables are designated by the programmer as variables that are to remain unrestored, in the event a process is restored. The current values of those selected environment variables are saved in the process' stack.

In another embodiment of the invention, other types of information components can be designated to remain unrestored. This invention is equally applicable to those components, even though the examples herein discuss environment variables.

After saving the current (or new) values of the selected variables in the stack, the process restores its Data Section by copying the Data Section from the checkpoint file written to when the checkpoint was taken into memory of the computing unit executing the process, STEP 502.

Subsequently, the new values of the environment variables saved in the stack, prior to restoring the Data Section, are now copied to the restored Data Section, STEP 504. In particular, the selected environment variables (or other information components) are written to a predefined area within the restored Data Section. This allows the stack to be overwritten without losing the new information.

Subsequently, the file descriptors and signal information are fixed to reflect the checkpoint, STEP 506. Embodiments of fixing the file descriptors and signal information are described in "Checkpoint and Migration of Unix Processes in the Condor Distributed Processing System", by Todd Tannenbaum, Michael Litzkow, Dr. Dobbs Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety.

In addition to the above, restoration of the stack begins. When performing user-level checkpoint/restart, there is difficulty in restoring the stack. This is because the process is running on its stack, while it is performing its restart operation. Since the process is using the stack during restart, it cannot safely overwrite its stack with the saved checkpoint stack. Thus, a temporary stack is used, STEP 508. The temporary stack is allocated (up-front) in the Data Section of the process. The process switches to the temporary stack by using, for instance, a setjmp/longjmp mechanism and by manipulating the stack pointer entry provided by the setjmp call. This is also further described in detail in "Checkpoint and Migration of Unix Processes in the Condor Distributed Processing System", by Todd Tannenbaum, Michael Litzkow, Dr. Dobbs Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety.

While running on the temporary stack, the original stack is restored, STEP 510. In particular, the stack contents are copied from the corresponding checkpoint file to memory. At this point, any environment variables in the stack and/or the Data Section (except for those copied in after the restore) have been restored to their values at the time of checkpoint. While this is acceptable in some instances; in others, it is desirable to adjust one or more of those values to reflect, for instance, the current operating environment. Thus, one or more of the environment variables are restored, in accordance with the principles of the present invention, STEP 512.

In order to reset the values of the selected environment variables to their new values, the process uses the information it saved in the predefined area of the Data Section. Specifically, the process resets the values of the variables located in the stack and/or the Data Section with the new values stored in the predefined area of the Data Section. In one example, this is performed using the setenv function call of UNIX.

Thereafter, the registers, including the stack pointer and program counter, are restored using the checkpointed data, STEP 514. In one example, this is performed using the UNIX longjmp command. At this point, the process is running on the original restored stack from the point where the checkpoint was taken. However, certain environment variables have been adjusted to new values, in accordance with the principles of the present invention. (In another embodiment, STEP 514 is performed before STEP 512.)

Described in detail above is a restore capability that allows selected information components, such as various environment variables, to be adjusted after a checkpointed process is restarted. When a process is restarted, the new environment variable information is noted and saved in the stack. Then, the Data Section is restored. Before restoring the stack (which would wipe out the new environment variable information), the new environment variable information is copied from the stack to the Data Section, to a place specifically designated to store this information. The stack is then restored. After the Data Section and stack are restored, the environment variables are set to the values they had at the time of taking the checkpoint. Thus, a system service, referred to as setenv, is invoked to reset the values of the desired environment variables, according to the information saved in the Data Section. The technique of the present invention is self-contained within the process, in that the restore is accomplished using the stack and Data Section of the process.

Variations to the above-described technique are possible. For example, in another embodiment, the desired environment variable information is stored in a special memory segment that is not touched during the restoration of the Data Section and stack. Alternatively, in a further embodiment, critical information about the environment variables is placed in a temporary file. Then, the file is read after completing the restore operation, and the environment variables are reset.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of restoring checkpointed processes, said method comprising:

restarting a process on a computing unit from a checkpoint taken of said process;

restoring one or more environment variables of said process using data obtained from said checkpoint, wherein one or more restored environment variables are provided;

changing a value of one restored environment variable of said one or more restored environment variables to a new value; and executing said process using the new value of said one restored environment variable.

2. The method of claim 1, further comprising saving said new value, prior to restoring said one or more environment variables.

3. The method of claim 2, wherein said saving comprises storing said new value in a stack of said process.

4. The method of claim 3, wherein said one or more environment variables are located in at least one of said stack and a data section of said process, and wherein said method further comprises:
   restoring said data section of said process using data obtained from said checkpoint, said restoring of said data section comprising restoring any of said one or more environment variables located within said data section;
   copying said new value from said stack to the restored data section;
   restoring said stack using data obtained from said checkpoint, said restoring of said stack comprising restoring any of said one or more environment variables located within said stack; and
   wherein said changing comprises replacing said value of said one restored environment variable located in one of the restored stack and the restored data section with said new value which is located in the restored data section.

5. The method of claim 4, wherein said storing said new value, said restoring said data section, said copying, said restoring said stack and said changing are performed by said process.

6. The method of claim 1, wherein said restoring and said changing are performed by said process.

7. A method of restoring checkpointed processes, said method comprising:
   restarting a process on a computing unit from a checkpoint taken of said process, wherein said process includes one or more environment variables located in at least one of a stack of said process and a data section of said process;
   saving in said stack at least one new value for at least one environment variable of said one or more environment variables;
   restoring said data section using information obtained from said checkpoint, wherein a restored data section is provided;
   copying said at least one new value from said stack to said restored data section;
   restoring said stack, subsequent to said copying, using information obtained from said checkpoint, wherein a restored stack is provided; and
   replacing at least one value for said at least one environment variable located in at least one of said restored stack and said restored data section with said at least one new value saved in said stack.

8. The method of claim 7, further comprising switching to a temporary stack prior to restoring said stack.

9. A system of restoring checkpointed processes, said system comprising:
   means for restarting a process on a computing unit from a checkpoint taken of said process;
   means for restoring one or more environment variables of said process using data obtained from said checkpoint, wherein one or more restored environment variables are provided;
   means for changing a value of one restored environment variable of said one or more restored environment variables to a new value; and
   means for executing said process using the new value of said one restored environment variable.

10. The system of claim 9, further comprising means for saving said new value, prior to restoring said one or more environment variables.

11. The system of claim 10, wherein said means for saving comprises means for storing said new value in a stack of said process.

12. The system of claim 11, wherein said one or more environment variables are located in at least one of said stack and a data section of said process, and wherein said system further comprises:
    means for restoring said data section of said process using data obtained from said checkpoint, said means for restoring said data section comprising means for restoring any of said one or more environment variables located within said data section;
    means for copying said new value from said stack to the restored data section;
    means for restoring said stack using data obtained from said checkpoint, said means for restoring said stack comprising means for restoring any of said one or more environment variables located within said stack; and
    wherein said means for changing comprises means for replacing said value of said one restored environment variable located in one of the restored stack and the restored data section with said new value which is located in the restored data section.

13. A system of restoring checkpointed processes, said system comprising:
    a computing unit adapted to restart a process from a checkpoint taken of said process, and to restore one or more environment variables of said process using data obtained from said checkpoint, wherein one or more restored environment variables are provided; and
    said computing unit being further adapted to change a value of one restored environment variable of said one or more restored environment variables to a new value, and to execute said process using the new value of said one restored environment variable.

14. A system of restoring checkpointed processes, said system comprising:
    means for restarting a process on a computing unit from a checkpoint taken of said process, wherein said process includes one or more environment variables located in at least one of a stack of said process and a data section of said process;
    means for saving in said stack at least one new value for at least one environment variable of said one or more environment variables;
    means for restoring said data section using information obtained from said checkpoint, wherein a restored data section is provided;
    means for copying said at least one new value from said stack to said restored data section;
    means for restoring said stack, subsequent to said copying, using information obtained from said checkpoint, wherein a restored stack is provided; and
    means for replacing at least one value for said at least one environment variable located in at least one of said restored stack and said restored data section with said at least one new value saved in said stack.

15. The system of claim 14, further comprising means for switching to a temporary stack prior to restoring said stack.

16. At least one program storage device readable by a machine, tangibly embodying at least one program of instructions executable by the machine to perform a method of restoring checkpointed processes, said method comprising:

restarting a process on a computing unit from a checkpoint taken of said process;

restoring one or more environment variables of said process using data obtained from said checkpoint, wherein one or more restored environment variables are provided;

changing a value of one restored environment variable of said one or more restored environment variables to a new value; and executing said process using the new value of said one restored environment variable.

17. The at least one program storage device of claim 18, wherein said method further comprises saving said new value, prior to restoring said one or more environment variables.

18. The at least one program storage device of claim 17, wherein said saving comprises storing said new value in a stack of said process.

19. The at least one program storage device of claim 18, wherein said one or more environment variables are located in at least one of said stack and a data section of said process, and wherein said method further comprises:

restoring said data section of said process using data obtained from said checkpoint, said restoring of said data section comprising restoring any of said one or more environment variables located within said data section;

copying said new value from said stack to the restored data section;

restoring said stack using data obtained from said checkpoint, said restoring of said stack comprising restoring any of said one or more environment variables located within said stack; and wherein said changing comprises replacing said value of said one restored environment variable located in one of the restored stack and the restored data section with said new value which is located in the restored data section.

20. The at least one program storage device of claim 19, wherein said storing said new value, said restoring said data section, said copying, said restoring said stack and said changing are performed by said process.

21. The at least one program storage device of claim 16, wherein said restoring and said changing are performed by said process.

22. An article of manufacture, comprising:

at least one computer usable medium having computer readable program code means embodied therein for causing the restoring of checkpointed processes, the computer readable program code means in said article of manufacture comprising:

computer readable program code means for causing a computer to restart a process on a computing unit from a checkpoint taken of said process, wherein said process includes one or more environment variables located in at least one of a stack of said process and a data section of said process;

computer readable program code means for causing a computer to save in said stack at least one new value for at least one environment variable of said one or more environment variables;

computer readable program code means for causing a computer to restore said data section using information obtained from said checkpoint, wherein a restored data section is provided;

computer readable program code means for causing a computer to copy said at least one new value from said stack to said restored data section;

computer readable program code means for causing a computer to restore said stack, subsequent to said copying, using information obtained from said checkpoint, wherein a restored stack is provided; and computer readable program code means for causing a computer to replace at least one value for said at least one environment variable located in at least one of said restored stack and said restored data section with said at least one new value saved in said stack.

23. The article of manufacture of claim 22, further comprising computer readable program code means for causing a computer to switch to a temporary stack prior to restoring said stack.

* * * * *

UNITED STATES PATENT AND TRADEMARK OFFICE
CERTIFICATE OF CORRECTION

PATENT NO. : 6,332,199 B1  Page 1 of 1
DATED : December 18, 2001
INVENTOR(S) : Meth et al.

It is certified that error appears in the above-identified patent and that said Letters Patent is hereby corrected as shown below:

<u>Title page,</u>
ABSTRACT, last line, delete "the" in the first instance;

Signed and Sealed this

Sixteenth Day of April, 2002

*Attest:*

JAMES E. ROGAN
*Attesting Officer*     *Director of the United States Patent and Trademark Office*